United States Patent
Noll et al.

(10) Patent No.: US 10,502,470 B2
(45) Date of Patent: Dec. 10, 2019

(54) SYSTEM AND METHOD TO MAINTAIN EVAPORATOR SUPERHEAT DURING PUMPED REFRIGERANT ECONOMIZER OPERATION

(71) Applicant: Liebert Corporation, Columbus, OH (US)

(72) Inventors: Roger Noll, Gahanna, OH (US); Daniel J. Schutte, Lewis Center, OH (US); Matthew Raven, Columbus, OH (US); John Birchmeier, Ashley, OH (US)

(73) Assignee: Vertiv Corporation, Columbus, OH (US)

( * ) Notice: Subject to any disclaimer, the term of this patent is extended or adjusted under 35 U.S.C. 154(b) by 353 days.

(21) Appl. No.: 15/277,569

(22) Filed: Sep. 27, 2016

(65) Prior Publication Data

US 2017/0276417 A1    Sep. 28, 2017

Related U.S. Application Data

(60) Provisional application No. 62/311,765, filed on Mar. 22, 2016.

(51) Int. Cl.
F25B 49/02 (2006.01)
F25B 31/00 (2006.01)

(52) U.S. Cl.
CPC .............. *F25B 49/02* (2013.01); *F25B 31/00* (2013.01); *F25B 2400/0401* (2013.01);
(Continued)

(58) Field of Classification Search
CPC .......... F25B 2400/0401; F25B 2600/13; F25B 2600/2513; F25B 2600/23; F25B 2600/21;
(Continued)

(56) References Cited

U.S. PATENT DOCUMENTS 5,355,305 A   10/1994   Seem et al.
5,506,768 A   4/1996    Seem et al.
(Continued)

FOREIGN PATENT DOCUMENTS

JP    2013092318 A    5/2013

OTHER PUBLICATIONS

European Patent Office Extended European Sarch Report for corresponding European Patent Application No. 161966502 dated May 26, 2017, 7 pages.
(Continued)

*Primary Examiner* — Christopher R Zerphey
*Assistant Examiner* — Schyler S Sanks
(74) *Attorney, Agent, or Firm* — Harness, Dickey & Pierce, P.L.C.

(57) ABSTRACT

The present disclosure relates to a method for controlling a level of superheat during a pump mode of operation of a refrigeration system, wherein the refrigeration system can operate in either the pump mode or a compressor mode, and has an electronically controlled expansion valve (EEV). A controller obtains a stored, predetermined pump differential pressure range able to be produced by a pump of the system. The controller also obtains a stored, predetermined superheat range, and detects a superheat level. When the detected superheat level is outside of the superheat temperature range, the controller commands adjusting at least one of the EEV and a speed of the pump based on whether the detected superheat level is above or below the superheat range, and whether a current pump differential pressure is above or below the predetermined pump differential pressure range.

15 Claims, 4 Drawing Sheets

(52) U.S. Cl.
CPC ....... *F25B 2400/13* (2013.01); *F25B 2500/28* (2013.01); *F25B 2600/13* (2013.01); *F25B 2600/21* (2013.01); *F25B 2600/23* (2013.01); *F25B 2600/2513* (2013.01); *F25B 2700/02* (2013.01); *F25B 2700/19* (2013.01); *F25B 2700/197* (2013.01); *F25B 2700/2104* (2013.01); *F25B 2700/2106* (2013.01); *F25B 2700/21172* (2013.01); *F25B 2700/21175* (2013.01)

(58) Field of Classification Search
CPC .. F25B 2700/21174; F25B 2700/21175; F25B 2700/1931; F25B 2700/1933; F25B 25/00; F25B 2341/064
USPC ..................................................... 62/DIG. 22
See application file for complete search history.

(56) References Cited

U.S. PATENT DOCUMENTS

| | | |
|---|---|---|
| 5,568,377 A | 10/1996 | Seem et al. |
| 5,684,686 A | 11/1997 | Reddy |
| 6,295,215 B1 | 9/2001 | Faria et al. |
| 6,937,909 B2 | 8/2005 | Seem |
| 6,950,321 B2 | 9/2005 | Stancu et al. |
| 7,324,354 B2 | 1/2008 | Joshi et al. |
| 7,331,191 B2 | 2/2008 | He et al. |
| 7,352,083 B2 | 4/2008 | Nielsen et al. |
| 7,456,524 B2 | 11/2008 | Nielsen et al. |
| 7,684,222 B2 | 3/2010 | Paatero |
| 7,890,215 B2 | 2/2011 | Duncan |
| 8,093,746 B2 | 1/2012 | Murali Dora et al. |
| 8,344,551 B2 | 1/2013 | Nielsen |
| 8,406,929 B2 | 3/2013 | Duncan |
| 8,583,289 B2 | 11/2013 | Stack et al. |
| 8,688,243 B2 | 4/2014 | Federspiel et al. |
| 8,793,003 B2 | 7/2014 | Laughman et al. |
| 8,842,452 B2 | 9/2014 | Nielsen |
| 9,091,496 B2 | 7/2015 | Imwalle et al. |
| 9,158,345 B1 | 10/2015 | Rice et al. |
| 9,214,874 B2 | 12/2015 | Kolhatkar et al. |
| 9,261,288 B2 | 2/2016 | Okamoto et al. |
| 9,278,303 B1 | 3/2016 | Somani et al. |
| 9,291,358 B2 | 3/2016 | Federspiel et al. |
| 9,300,171 B2 | 3/2016 | Moth |
| 2005/0105229 A1 | 5/2005 | Deng et al. |
| 2006/0043797 A1 | 3/2006 | Hjort et al. |
| 2006/0191286 A1* | 8/2006 | Park ................. F25B 13/00 62/434 |
| 2008/0005161 A1 | 1/2008 | Grealish et al. |
| 2009/0090117 A1* | 4/2009 | McSweeney ....... F25B 49/005 62/204 |
| 2013/0258725 A1 | 10/2013 | Colombi et al. |
| 2014/0031956 A1 | 1/2014 | Slessman et al. |
| 2014/0033753 A1* | 2/2014 | Lu ..................... F25B 49/02 62/190 |
| 2014/0242899 A1 | 8/2014 | Liu |
| 2015/0137595 A1 | 5/2015 | Xu et al. |
| 2015/0233597 A1 | 8/2015 | Dempster et al. |
| 2016/0013728 A1 | 1/2016 | Giuntini et al. |
| 2016/0047578 A1 | 2/2016 | Warren |
| 2016/0211784 A1 | 7/2016 | Fujisawa et al. |

OTHER PUBLICATIONS

Johnson Controls, Inc., Regional Controls Team, Asia. "Introduction to PRAC (Pattern Recognition Adaptive Control)," (2010) 8 pages.

Siemens Switzerland, Ltd. "Control of ventilation and air conditioning plants," (2004) 138 pages.

Xiaoqing, Z. "Self-Tuning Fuzzy Controller for Air Conditioning Systems." Master's thesis, National University of Singapore, (204) 102 pages.

Bjerre, Michael; Eriksen, Jacob G. I.; Kano, Mugisa Y.; Qadri, Dennis R.; and Ullum, Thomas. "Temperature and Pressure control using PI control theory". Project report, Aalborg University, Copenhagen, Denmark, (2012) 74 pages.

\* cited by examiner

Table 1

| Superheat Control | Pump Differential Pressure Control | EEV Adjustment |
|---|---|---|
| Below lower threshold | Below lower threshold | Use lower of SH or Pump Diff Control EEV positon down to Min EEV open % setting & maintain Pump Differential upper threshold |
| Below lower threshold | Between thresholds | Close EEV based on SH Control position down to Min EEV open % setting & maintain Pump Differential current upper threshold |
| Below lower threshold | Above upper threshold | Close EEV based on SH Control position down to Min EEV open % setting & maintain Pump Differential current upper threshold |
| Between thresholds | Below lower threshold | Close EEV based on Pump Diff Control position down to Min EEV open % setting & maintain Pump Differential current upper threshold |
| Between thresholds | Between thresholds | Maintain current EEV position & Pump Diff current adjusted upper threshold |
| Between thresholds | Above upper threshold | Maintain current EEV position & Pump Diff current adjusted upper threshold |
| Above upper threshold | Below lower threshold | Close EEV based on Pump Diff Control position down to Min EEV open % setting & reduce Pump Differential upper threshold based on pump pressure upper threshold adjustment step |
| Above upper threshold | Between thresholds | Open EEV the fixed EEV open step value & reduce Pump Differential upper threshold based on pump pressure upper threshold adjustment step |
| Above upper threshold | Above upper threshold | Open EEV the fixed EEV open step value & maintain Pump Differential current upper threshold |

FIGURE 4

SYSTEM AND METHOD TO MAINTAIN EVAPORATOR SUPERHEAT DURING PUMPED REFRIGERANT ECONOMIZER OPERATION

CROSS REFERENCE TO RELATED APPLICATIONS

The present application claims priority from U.S. provisional application Ser. No. 62/311,765, filed Mar. 22, 2016, the entire disclosure of which is hereby incorporated by reference into the present disclosure.

FIELD

The present disclosure relates to refrigeration systems, and more particularly to a refrigeration system and a control method used in connection with the refrigeration system having a pumped refrigerant "economizer" mode of operation, and still more particularly to a system and method for monitoring and controlling differential pump pressure and superheat to prevent damage to a compressor of the system when operating in a pump mode (i.e., refrigerant economizer mode), and when the system switches from the pump mode to compressor mode.

BACKGROUND

The statements in this section merely provide background information related to the present disclosure and may not constitute prior art.

The assignee of the present disclosure is a leader in the field of environmental control system used in small, medium and large scale data centers. As opposed to the more conventional air side economizer, the system described in this application uses a pumped refrigerant economizer. A pumped refrigerant economizer system utilizes a liquid pump to circulate refrigerant instead of operating the compressor when the indoor & outdoor temperature conditions are suitable to provide cooling without requiring a vapor compression cycle.

A pumped refrigerant economizer system also typically uses a system of sensors to measure the outside and inside air conditions, and if the outside conditions are suitable to allow cooling without requiring compression of the refrigerant, a liquid pump is used in place of the compressor to provide refrigerant flow through the system. This mode of operation is known in the industry as the "pump mode". Running in the pumped mode reduces or eliminates the need for the air conditioning system's compressor(s) to run. This results in a significant energy savings for cooling the space. In "compressor mode" of operation, the compressor(s) of the system is/are running to supply the cooling needs for the space.

When running in pump mode, however, care must be taken to not incur damage to various components of the system. In particular, it is understood that the lack of superheat leaving the evaporator during the pump mode can eventually lead to excessive liquid refrigerant collecting in the crankcase of the compressor. This can have detrimental effects on the compressor if a sufficient quantity of liquid refrigerant has collected in the compressor crankcase during the pump mode, and then the compressor mode is started. Excessive liquid accumulating in the crankcase (i.e., sump) of the compressor may potentially cause various issues such as sump frosting and/or oil foaming, oil dilution and/or washout when the compressor attempts to start up during transitions from the pump mode to the compressor mode.

While present day economizer systems adjust the system's EEV (Electronic Expansion Valve) to maintain appropriate pump differential pressure while operating in the pump mode, there is no control over the superheat leaving the evaporator when the system is running in the pump mode. Accordingly, some means to control and limit the liquid refrigerant build-up in the compressor during the pump mode of operation is needed.

SUMMARY

In one aspect the present disclosure relates to a method for controlling a level of superheat during a pump mode of operation of a refrigeration system, wherein the refrigeration system is able to operate in either the pump mode or a compressor mode of operation and includes an electronically controlled expansion valve (EEV). The method may comprise using a controller to obtain a stored, predetermined pump differential pressure range able to be produced by a pump of the refrigeration system. The controller may also be used to obtain a stored, predetermined superheat range, and to detect a superheat level. When the detected superheat level is outside of the predetermined superheat temperature range, the controller may be used to command adjusting at least one of the EEV and a speed of the pump based on whether the detected superheat level is above or below the predetermined superheat range, and whether a current pump differential pressure is above or below the predetermined pump differential pressure range.

In another aspect the present disclosure relates to a method for controlling a level of superheat during a pump mode of operation of a refrigeration system, wherein the refrigeration system is able to operate in either the pump mode or a compressor mode of operation, and includes an electronically controlled expansion valve (EEV). The method may comprise defining a fixed adjustment step for the EEV, defining a fixed adjustment step for a change in pump speed, and defining a time delay interval to be applied between successive adjustments of the EEV and the pump speed. The method may further comprise using a controller to obtain a stored, predetermined pump differential pressure range able to be produced by a pump of the refrigeration system, as well as using the controller to obtain a stored, predetermined superheat range. The method may further include detecting a superheat level, and when the detected superheat level is outside of the predetermined superheat temperature range, adjusting the EEV and a speed of the pump based on whether the detected superheat level is above or below the predetermined superheat range, and in accordance with the predetermined EEV and pump speed fixed adjustment steps.

In still another aspect the present disclosure relates to a refrigeration system configured to control a level of superheat during a pump mode of operation. The refrigeration system is able to operate in either the pump mode or a compressor mode of operation, and comprises a pump, an electronically controlled expansion valve (EEV), and a controller for controlling adjustments of the EEV and the pump. The controller further may be configured to obtain a stored, predetermined pump differential pressure range able to be produced by the pump, to obtain a stored, predetermined superheat range, and to detect a superheat level during operation of the refrigeration system. When the detected superheat level is outside of the predetermined superheat temperature range, the controller adjusts the EEV and a speed of the pump based on whether the detected superheat level is above or below the predetermined superheat range.

BRIEF DESCRIPTION OF DRAWINGS

The drawings described herein are for illustration purposes only and are not intended to limit the scope of the present disclosure in any way.

FIG. 4 is a table of various control adjustment parameters that the controller observes when applying adjustments during use of the superheat control algorithm.

DETAILED DESCRIPTION

Figure 1:
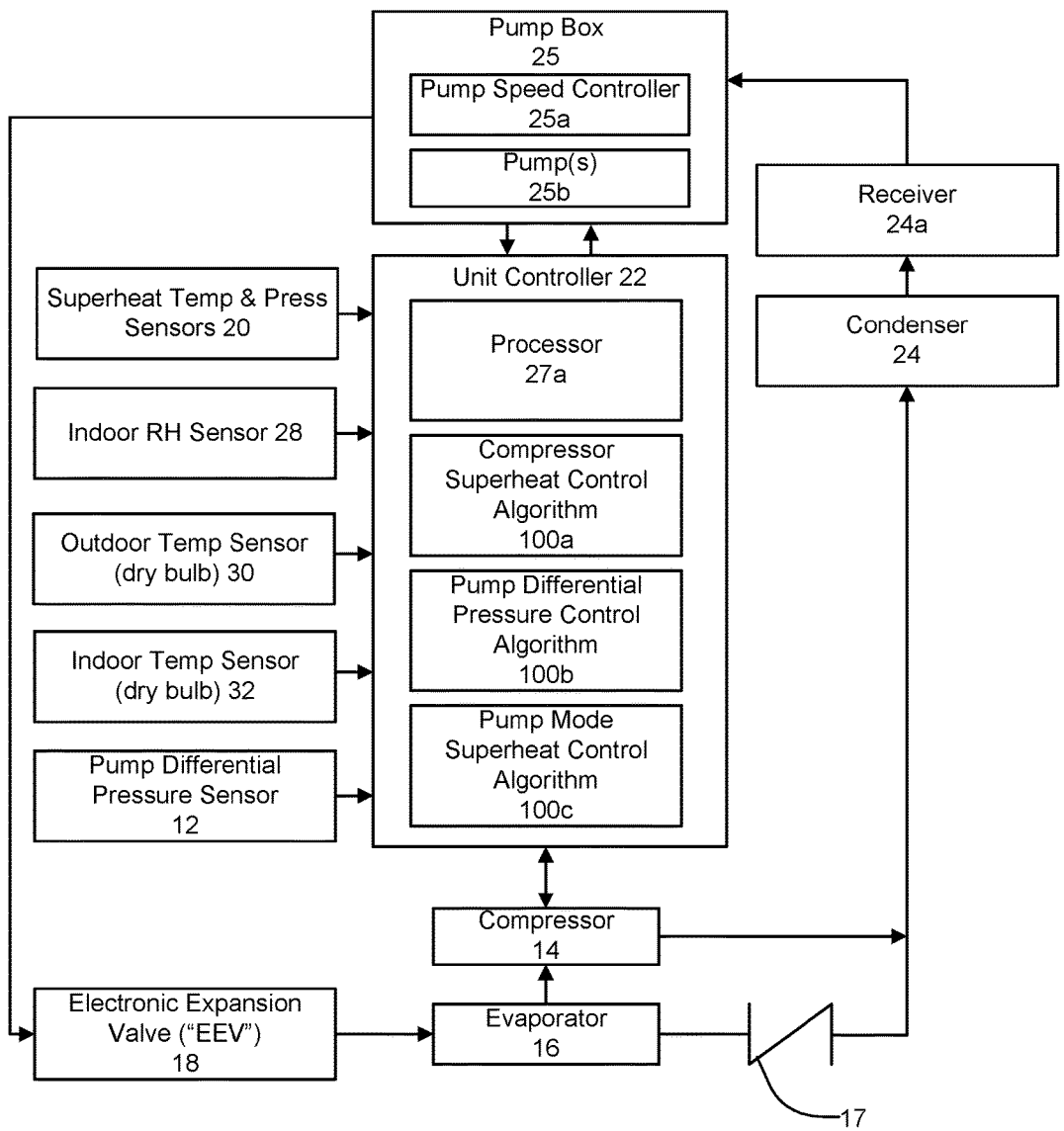
FIG. 1 is a high level block diagram of one embodiment of a refrigeration system of the present disclosure that incorporates an electronic controller based subsystem for controlling an electronic expansion valve to regulate pump differential pressure and evaporator superheat during a pumped mode of operation of the system.

The following description is merely exemplary in nature and is not intended to limit the present disclosure, application, or uses. It should be understood that throughout the drawings, corresponding reference numerals indicate like or corresponding parts and features.

The present system and method involves using an electronic expansion valve (EEV) is used to regulate pump differential pressure during the pumped mode of operation. In addition, the system and method involves applying a control routine to control superheat leaving the evaporator. The superheat leaving the evaporator is controlled in conjunction with the pump differential pressure, which eliminates or significantly reduces the possibility of liquid refrigerant collecting in the compressor crankcase (i.e. sump) and causing oil dilution during the pumped mode of operation. Importantly, the system and method does not negatively affect the overall efficiency of the system.

Referring to FIG. 1 a refrigeration system 10 in accordance with one embodiment of the present disclosure is shown. The system 10 in this example forms an economizer system and is therefore able to operate in both a "pump" mode and a "compressor" mode. In the pump mode, lower temperature outside air is able to condense refrigerant at a lower pressure and a liquid refrigerant pump circulates refrigerant to cool the refrigerant and an interior room or building, with the compressor(s) of the system turned off. In the compressor mode the compressor(s) is/are used to help cool the interior of the room or building. In this example the system 10 includes at least one compressor 14, an evaporator 16, a check valve 17, an electronic expansion valve ("EEV") 18, a superheat temperature and pressure sensor 20, and a pump differential pressure sensor 12. The compressor 14 and pump differential pressure sensor 12 are in bidirectional communication with a unit controller 22. The unit controller 22 includes a processor 22a, in one example a microprocessor, which may run a compressor superheat control algorithm 100a, a pump differential pressure control algorithm 100b, and a pump mode superheat control algorithm 100c, all stored in non-volatile RAM or ROM. It will be appreciated that the compressor superheat control algorithm 100a is a standard algorithm that has been used in the industry for controlling superheat coming out of the evaporator 16 when operating in the compressor mode. Details of the pump differential control algorithm 100b may be found in U.S. Pat. Nos. 9,316,424 and 8,881,541, the disclosures of both of which are hereby incorporated by reference into the present application. The pump mode superheat control algorithm 100c, which is an important feature of the present disclosure, will be discussed in further detail in connection with FIGS. 2 and 3.

The system 10 further includes a condenser 24 which is used to receive hot gas from the compressor 14 during compressor mode and to provide heat transfer for the refrigerant during pump mode. The liquid refrigerant flows to a conventional receiver 24a which is able to hold a predetermined quantity of the refrigerant charge, if needed, during operation of the system 10. The liquid refrigerant continues to flow through a pump box 25, through a liquid line 27, and back to the electronic expansion valve 18, as is well known with air conditioning systems. The pump box 25 contains refrigerant pump(s) 25b and pump speed controls, including a pump speed controller 25a, for operation during economization mode. Historically the pump speed controller 25a will modulate the pump speed to meet the cooling demand and the unit controller 22 will modulate the EEV 18 to maintain pump differential pressure. In conjunction, this maintains refrigerant flow to the evaporator 16 in a method such that the cooling load in the room or data center is satisfied. If the outdoor temperature increases such that the load cannot be maintained, the unit controller 22 will turn the pumps 'off' and turn the compressor(s) 'on' to ensure the room load is maintained. During compressor operation the unit controller 22 maintains superheat using the superheat temperature and pressure sensor 20 as inputs to the compressor mode superheat control algorithm 100a.

In a different embodiment, the unit controller 22 may also use the pump mode superheat control algorithm 100c, shown in FIG. 1, to determine an EEV position based on the superheat temperature and pressure sensor 20. In this embodiment the unit controller 22 evaluates the superheat and pump differential condition to determine an appropriate EEV 18 position to best satisfy both conditions as described below. Additionally the unit controller 22 will determine a maximum pump speed limit based on the EEV 18 position and communicate this to the pump speed controller 25a to limit pump speed adjustment.

The system 10 shown in FIG. 1 also makes use of a an indoor relative humidity temperature sensor 28, an outdoor temperature (dry bulb) sensor 30 and an indoor (dry bulb) temperature sensor 32.

Figure 2:
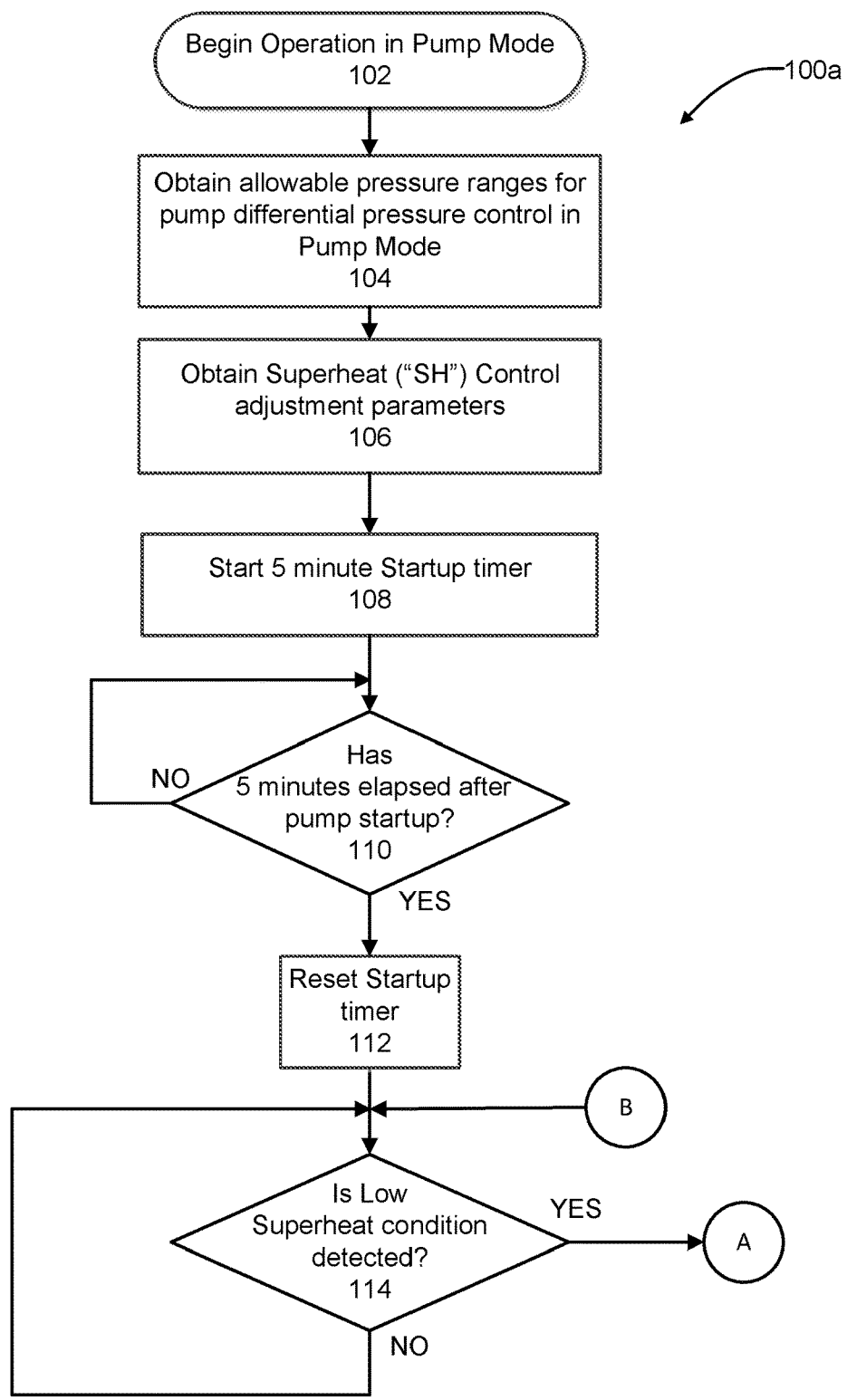
FIG. 2 is a high level flowchart showing operations associated a superheat control algorithm implemented by the controller of the system.

Referring to FIG. 2, the unit controller 22 implements the compressor superheat control algorithm 100c to monitor and control the superheat leaving the evaporator coil 16, while also monitoring and controlling the pump differential pressure. Initially, when operating in pump mode, the pump differential pressure control algorithm 100b for the system 10 defines an allowable pressure range made up of allowable upper and lower default pump pressure thresholds. A PID (proportional integral/derivative) calculation is used by the unit controller 22 to adjust the EEV 18 position during operation outside the allowable range. The new pump mode superheat ("SH") control algorithm 100c applies the following additional parameters when making EEV 18 position adjustments in conjunction with the pump differential control:

SH Control EEV close step (a percentage step value for making one adjustment when opening the EEV 18);

SH Control open step (a percentage step value for making one adjustment when closing the EEV 18);

Lower SH threshold (a predefined lower SH temperature threshold value);

Upper SH threshold (a predefined upper SH temperature threshold value);

Adjustment time delay (time delay between making successive adjustments of the EEV 18);

Adjusted maximum pump 25b pressure upper threshold;

Pump pressure upper threshold adjustment step (a percentage value when making a single adjustment step to set the pump 25b pressure upper threshold); and Maximum allowable pump 25b speed setting based on the EEV 18 position. For the above parameters, "pump speed" and "pump pressure" refer to the motor speed of the pump 25b and the differential pressure across the pump 25b.

Referring specifically to FIG. 2, various operations that may be associated with the pump mode superheat control algorithm 100c are illustrated. At operation 102 the system 10 begins operation in the pump mode. At operation 104 the unit controller 22 obtains allowable pressure ranges for pump differential pressure control in the pump mode. The unit controller 22 then obtains various superheat control adjustment parameters that the unit controller will observe when applying adjustments, as indicated at operation 106. These parameters are illustrated in the table shown in FIG. 4.

At operation 108 a startup timer included in the unit controller 22, and associated with the pump start up condition determined by the unit controller, is then started. The startup timer allows for system pressures and temperatures to stabilize after pump mode operation is started to prevent erratic reaction to a transitory superheat condition. At operation 110 a check is made by the unit controller 22 to determine if the startup time has timed out and (e.g., 5 minutes has elapsed after pump startup), if not, the startup time is repeatedly checked by the unit controller 22 until the startup timer is detected as having timed out. When this event occurs, the unit controller 22 resets the startup time, as indicated at operation 112, and then checks to determine if a low superheat condition is detected, as indicated at operation 114. As noted above, this condition is determined by having the unit controller 22 evaluate and compare the actual suction temperature and pressure to a saturated temperature calculated from the suction pressure, to determine if the superheat temperature is below the predetermined lower superheat threshold. More specifically, the unit controller 22 is looking at the temperature and pressure of the refrigerant leaving the evaporator 16 and calculating the difference between the actual temperature and the saturated refrigerant temperature at the measured pressure condition (superheat). If the superheat temperature is above the predetermined lower superheat threshold, then operation 114 is repeated. If the superheat temperature is below the predetermined lower superheat threshold, then a low superheat condition is detected and the unit controller 22 implements a low superheat adjustment routine 200, which is a subportion of algorithm 100c, and which is shown in detail in FIG. 3.

The low superheat adjustment routine 200 involves using the unit controller 22 to initially adjust the maximum pump pressure upper threshold to prevent the differential pressure control routine from calculating a more open valve position when the valve is closed by the superheat control routine, as indicated at operation 202. Then the EEV is closed by a predetermined amount (e.g., percentage), which comprises one adjustment "step" (i.e., "increment") to reduce refrigerant flow to the evaporator and increasing superheat, as indicated at operation 204.

At operation 206 the unit controller 22 then starts an adjustment time delay timer.

Figure 3:
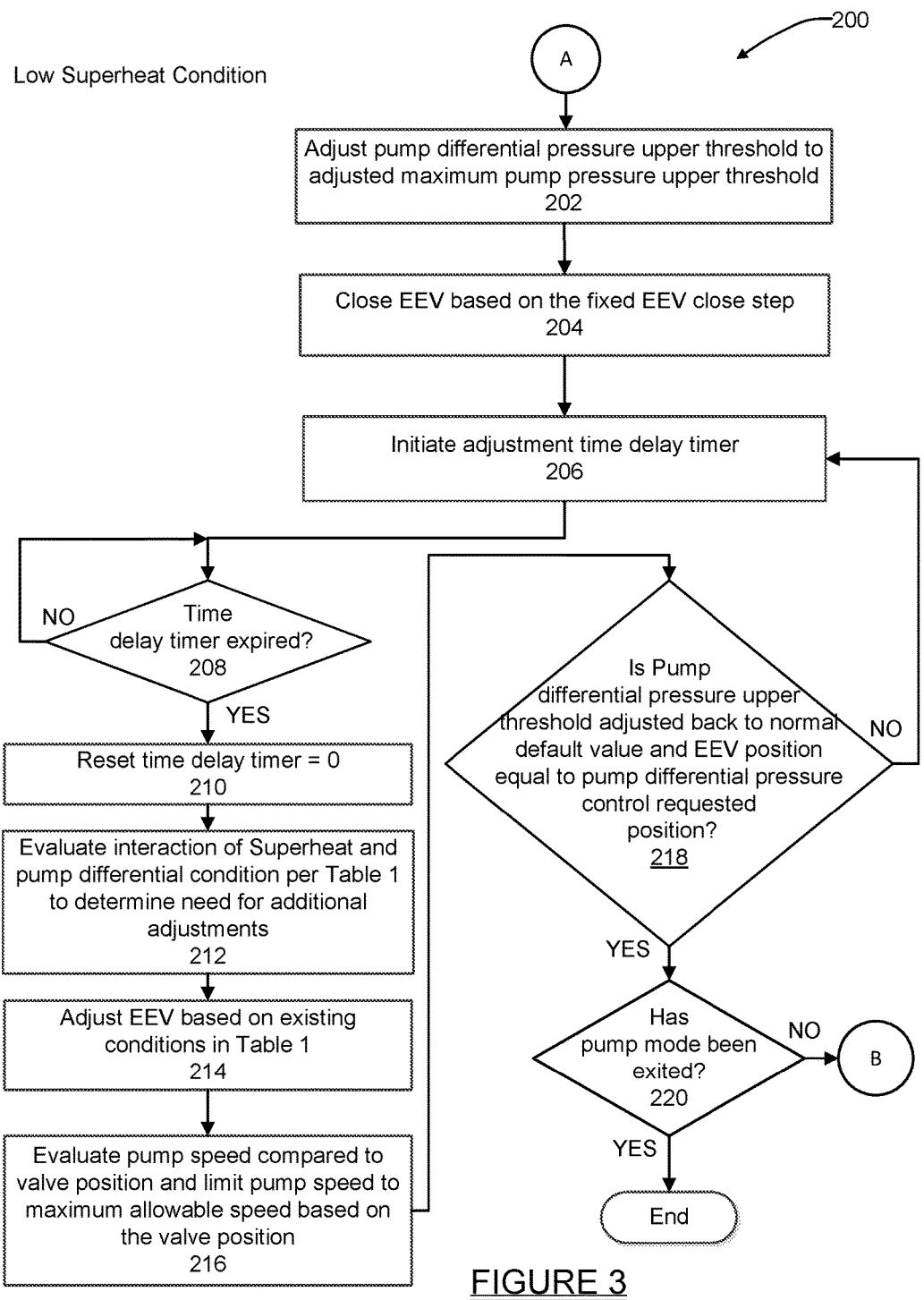
FIG. 3 is a flowchart of a low superheat adjustment routine implemented by the controller.

Referring further to FIG. 3, the unit controller 22 then begins checking, as indicated at operation 208, if the adjustment time delay timer has timed out. If a check produces a "No" answer, then operation 208 is repeated by the unit controller 22. If the check at operation 208 produces a "Yes" answer, then the adjustment time delay timer is reset by the unit controller 22, as indicated at operation 210, and the unit controller then evaluates the interaction of superheat and pump differential conditions, as indicated at operation 212, per the conditions listed in Table 1 of FIG. 4. More specifically, the unit controller 22 examines the low superheat temperature and the pump differential pressure to determine which one of the conditions in Table 1 (FIG. 4) is present. Assuming that the low superheat condition is still present, the unit controller 22 adjusts the EEV 18 based on the specific condition from Table 1 that is present, as indicated at operation 214. At operation 216 the unit controller 22 then evaluates the pump speed compared to the EEV 18 position and limits pump speed to the maximum allowable speed based on the current EEV 18 position. It will be appreciated that the maximum allowable pump speed for each EEV 18 position will also vary depending on the EEV 18 size and pump 25b displacement.

With continuing reference to FIG. 3, the unit controller 22 then makes a check using the pump differential pressure sensor 12 to determine if the pump differential pressure upper threshold is adjusted back to the normal default value and if the current EEV 18 position is equal to the pump differential pressure control requested position, as indicated at operation 218. A check is then made by the unit controller 22 to determine if the pump mode has been exited, as indicated at operation 220. If it has, then the low superheat adjustment routine 200 ends. If the pump mode has not been exited yet, then at operation 114 (FIG. 1) the unit controller 22 begins checking again for the presence of a superheat condition.

The system and method of the present disclosure thus enables operation of economizer systems in both the pump and compressor modes while eliminating, or at least substantially reducing, the chance of liquid refrigerant being supplied to the suction inlet of the compressor(s) of the system 10 when the system exits the pump mode and begins operating in the compressor mode. The system 10 and method of the present disclosure does not require the addition of significant new components to the system or otherwise significantly complicate the operation of the system or reduce its efficiency, or increase its cost. The system and method of the present disclosure can also be retrofitted to existing economizer systems with only minor modifications.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for controlling a level of superheat during a pump mode of operation of a refrigeration system, wherein the refrigeration system is able to operate in either the pump mode or a compressor mode of operation and includes an electronically controlled expansion valve (EEV), the method comprising:

using a controller to obtain a stored, predetermined pump differential pressure range able to be produced by a pump of the refrigeration system;

using the controller to obtain a stored, predetermined superheat temperature range;

detecting a superheat level;

determining that the detected superheat level is outside of the predetermined superheat temperature range, and then using the controller to command adjusting at least one of the EEV and a speed of the pump based on whether the superheat level is above or below the predetermined superheat range, and whether a current pump differential pressure is above or below the predetermined pump differential pressure range; and further comprising detecting that the superheat level is below a lower limit of the predetermined superheat range, and that a pump pressure differential is within the predetermined pump differential pressure range, and then closing the EEV by a fixed predetermined percentage and maintaining a current pump speed to maintain a current value of the pump differential pressure.

2. The method of claim 1, further comprising defining an adjustment step for the EEV.

3. The method of claim 2, further comprising:
making an adjustment to the EEV; and
waiting a minimum predetermined time interval after the adjustment has been made to the EEV before making a subsequent adjustment to the EEV.

4. The method of claim 1, further comprising:
making an adjustment to the speed of the pump using a predefined adjustment step.

5. The method of claim 1, further comprising implementing a predetermined time delay between successive adjustments of either the EEV or the speed of the pump.

6. The method of claim 1, further comprising:
making an adjustment to the EEV;
defining a position adjustment step, representing a percentage change from a current operating position of the EEV, which is followed each time the adjustment is made to the EEV;
making a speed adjustment to the pump; and
defining a speed adjustment step, representing a percentage change from a maximum pump speed, which is followed each time the speed adjustment is made to the pump.

7. The method of claim 1, further comprising detecting that the superheat level is below the lower limit of the predetermined superheat range, and that the pump pressure differential is below a lower threshold of the predetermined pump differential pressure range, then closing the EEV by the fixed predetermined percentage and controlling a speed of the pump to maintain a current pump differential pressure at an upper threshold of the predetermined pump differential pressure range.

8. The method of claim 1, further comprising detecting that the superheat level is below the lower limit of the predetermined superheat range, and that the pump pressure differential is above an upper threshold of the predetermined pump differential pressure range, and then closing the EEV by a predetermined percentage and maintaining a current pump speed to maintain a current value of the pump differential pressure.

9. The method of claim 1, further comprising detecting that the superheat level is within the predetermined superheat range, and that the pump pressure differential is within the predetermined pump differential pressure range, then maintaining a current position of the EEV and maintaining the current pump speed to maintain the current value of the pump differential pressure.

10. The method of claim 1, further comprising detecting that the superheat level is within the predetermined superheat range, and that the pump pressure differential is above an upper threshold of the predetermined pump differential pressure range, then maintaining the current position of the EEV and maintaining a current pump speed to maintain the current value of the pump differential pressure.

11. The method of claim 1, further comprising detecting that the superheat level is above a predetermined upper threshold of the predetermined superheat range, and that the pump pressure differential is below a lower threshold of the predetermined pump differential pressure range, then closing the EEV by a predetermined percentage and reducing a speed of the pump to reduce an upper threshold of the pump differential pressure range by a predetermined fixed value.

12. The method of claim 1, further comprising detecting that the superheat level is above a predetermined upper threshold of the predetermined superheat range, and that a detected pump differential pressure is within the predetermined pump differential pressure range, and then opening the EEV by a predetermined percentage and reducing a speed of the pump speed to thus reduce an upper threshold of the pump differential pressure range by a predetermined fixed value.

13. The method of claim 1, further comprising detecting that when the superheat level is above a predetermined upper threshold of the predetermined superheat range, and that the pump pressure differential is above an upper threshold of the predetermined pump differential pressure range, and then opening the EEV by a predetermined percentage and maintaining the current pump speed to maintain a current upper threshold of the pump differential pressure range.

14. A method for controlling a level of superheat during a pump mode of operation of a refrigeration system, wherein the refrigeration system is able to operate in either the pump mode or a compressor mode of operation and includes an electronically controlled expansion valve (EEV), the method comprising:

using a controller to obtain a stored, predetermined pump differential pressure range able to be produced by a pump of the refrigeration system;

using the controller to obtain a stored, predetermined superheat temperature range;

detecting a superheat level;

determining that the detected superheat level is outside of the predetermined superheat temperature range, and then using the controller to command adjusting at least one of the EEV and a speed of the pump based on whether the superheat level is above or below the predetermined superheat range, and whether a current pump differential pressure is above or below the predetermined pump differential pressure range; and further comprising detecting that the superheat level is within the predetermined superheat range, and that a pump pressure differential is below a lower threshold of the predetermined pump differential pressure range, and then closing the EEV by a predetermined percentage and maintaining a current pump speed to maintain a current value of the pump differential pressure.

15. A method for controlling a level of superheat during a pump mode of operation of a refrigeration system, wherein the refrigeration system is able to operate in either the pump mode or a compressor mode of operation and includes an electronically controlled expansion valve (EEV), the method comprising:
- using a controller to obtain a stored, predetermined pump differential pressure range able to be produced by a pump of the refrigeration system;
- using the controller to obtain a stored, predetermined superheat temperature range;
- detecting a superheat level;
- determining that the detected superheat level is outside of the predetermined superheat temperature range, and then using the controller to command adjusting at least one of the EEV and a speed of the pump based on whether the superheat level is above or below the predetermined superheat range, and whether a current pump differential pressure is above or below the predetermined pump differential pressure range; and
- further including detecting that the superheat level is above a predetermined upper threshold of the predetermined superheat range, and that a pump pressure differential is within the predetermined pump differential pressure range, then opening the EEV by a predetermined percentage and reducing a speed of the pump speed to thus reduce an upper threshold of the pump differential pressure range by a predetermined fixed value.

* * * * *